United States Patent
Takeuchi

(10) Patent No.: US 9,678,357 B2
(45) Date of Patent: Jun. 13, 2017

(54) IMAGE STABILIZATION APPARATUS AND METHOD OF CONTROLLING THE SAME, AND STORAGE MEDIUM

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 14/687,756

(22) Filed: Apr. 15, 2015

(65) Prior Publication Data

US 2015/0301353 A1 Oct. 22, 2015

(30) Foreign Application Priority Data

Apr. 16, 2014 (JP) .................................. 2014-084964

(51) Int. Cl.
*G02B 27/64* (2006.01)
*H04N 5/232* (2006.01)

(52) U.S. Cl.
CPC ....... *G02B 27/646* (2013.01); *H04N 5/23283* (2013.01); *H04N 5/23287* (2013.01)

(58) Field of Classification Search
CPC ............. G02B 27/646; H04N 5/23287; H04N 5/23283
USPC ......................................... 348/208.7, 208.11
See application file for complete search history.

(56) References Cited

U.S. PATENT DOCUMENTS

| | | | | |
|---|---|---|---|---|
| 6,414,715 B1* | 7/2002 | Sato | ..................... | G02B 27/646 348/207.99 |
| 7,679,645 B2* | 3/2010 | Takahashi | ............... | H04N 5/217 348/187 |
| 2006/0132612 A1* | 6/2006 | Kawahara | .......... | H04N 5/23248 348/208.6 |
| 2012/0257278 A1* | 10/2012 | Simonov | .................. | G02B 3/02 359/557 |
| 2014/0211030 A1* | 7/2014 | Hideshima | ............... | G03B 5/00 348/208.11 |

FOREIGN PATENT DOCUMENTS

JP 2002-250952 A 9/2002

* cited by examiner

*Primary Examiner* — Albert Cutler
(74) *Attorney, Agent, or Firm* — Cowan, Liebowitz & Latman, P.C.

(57) ABSTRACT

An image stabilization apparatus comprises first optical correction unit configured to optically correct an image blur, second optical correction unit configured to optically correct the image blur, first restriction unit configured to set a first restriction which restricts a driving range of the first optical correction unit, subtraction unit configured to obtain a result of subtraction by subtracting the shake signal to which the first restriction has been set from the shake signal detected by the shake detection unit, second restriction unit configured to set a second restriction which restricts a driving range of the second optical correction unit to the result of subtraction, change unit configured to change a restriction values, and control unit configured to control the first and second optical correction units.

10 Claims, 9 Drawing Sheets

F I G. 6

| VARIABLE MAGNIFICATION RATIO POINT | FIRST DRIVE LIMITER505 | THIRD DRIVE LIMITER506 |
|---|---|---|
| 0 (WIDE-ANGLE SIDE) | 100% | 0% |
| 1 (Middle) | 50% | 50% |
| 3 (HIGH-MAGNIFICATION SIDE) | 0% | 100% |

F I G. 8A

| | FIRST IMAGE STABILIZATION MEANS | SECOND IMAGE STABILIZATION MEANS |
|---|---|---|
| IMAGE STABILIZATION TARGET POSITION | SHAKE SIGNAL OBTAINED BY RESTRICTING IMAGE BLUR DETECTION SIGNAL USING PREDETERMINED VALUE | SHAKE SIGNAL OBTAINED BY SUBTRACTING TARGET VALUE OF FIRST IMAGE STABILIZATION MEANS FROM IMAGE BLUR DETECTION SIGNAL |
| AMPLIFICATION RATIO OF POSITION DETECTION SIGNAL | SMALL | LARGE |
| FREQUENCY BAND OF FEEDBACK CONTROL MEANS | NARROW | WIDE |

F I G. 8B

| | FIRST IMAGE STABILIZATION MEANS | SECOND IMAGE STABILIZATION MEANS |
|---|---|---|
| DRIVING METHOD | TILT | SHIFT |
| DEGRADATION IN OPTICAL PERFORMANCE CAUSED BY LENS DRIVING | SMALL | LARGE |

IMAGE STABILIZATION APPARATUS AND METHOD OF CONTROLLING THE SAME, AND STORAGE MEDIUM

BACKGROUND OF THE INVENTION

Field of the Invention

The present invention relates to an image stabilization apparatus configured to obtain a high-resolution image using a plurality of actuation means such as a variable angle prism or a shift lens for changing an imaging position with respect to an imaging plane and a method of controlling the same.

Description of the Related Art

In an image captured by an image capturing apparatus such as a digital camera, an object image sometimes blurs when, for example, the hand of a user holding the camera body swings at the time of image capturing to cause a so-called camera shake. The digital camera has a function of correcting an object image blur that appears in a captured image owing to vibrations acting on the camera body. Conventionally, optical image stabilization processing and electronic image stabilization processing have been known as a means for correcting such an image blur. This means is implemented by canceling the image blur by these processing operations.

In optical image stabilization processing, a vibration acting on the camera body is detected by an angular velocity sensor or the like, and an image stabilization lens provided inside an imaging optical system which forms an object image based on this detection result is moved to change the optical axis direction of the imaging optical system. Accordingly, in optical image stabilization processing, an image formed on the light receiving surface of an image sensor is moved to correct the image blur. In electronic image stabilization processing, image processing is performed on the captured image to pseudo-correct an image blur.

The image stabilization apparatus of the conventional image capturing apparatus has the following two problems in achieving a sufficient shake correction effect when driving a correction optical system. The problems are a delay in the traceability of a driving unit with respect to a target driving amount and the narrowness of a shake correction range.

To solve these problems, Japanese Patent Laid-Open No. 2002-250952 has proposed a method in which two shake correction optical systems are provided to switch lenses to be driven when a focal length is on the telephoto side or on the wide-angle side.

Japanese Patent Laid-Open No. 2002-250952 has only described that the focal length information of an image capturing apparatus is obtained and use of one of the two shake correction optical systems is selected depending on whether the focal length is larger than a predetermined value. However, Japanese Patent Laid-Open No. 2002-250952 has not described a measure for discontinuity in driving of a shake correction lens such as an actually problematic abrupt change in the field of view of a shot image that occurs at the time of changing the shake correction optical systems.

SUMMARY OF THE INVENTION

The present invention has been made in consideration of the above-described problems and provides an image stabilization apparatus which can implement good image stabilization without unnaturalness of a shot image in a system including two shake correction optical systems.

According to the first aspect of the present invention, there is provided an image stabilization apparatus comprising: first optical correction unit configured to optically correct an image blur by moving in a direction different from an optical axis; second optical correction unit, arranged in a position different from the first optical correction unit in the optical axis direction, configured to optically correct the image blur by moving in the direction different from the optical axis; first restriction unit configured to set a first restriction which restricts a driving range of the first optical correction unit to a shake signal detected by shake detection unit; subtraction unit configured to obtain a result of subtraction by subtracting the shake signal to which the first restriction has been set from the shake signal detected by the shake detection unit; second restriction unit configured to set a second restriction which restricts a driving range of the second optical correction unit to the result of subtraction; change unit configured to change a restriction value of the first restriction unit and a restriction value of the second restriction unit; and control unit configured to control the first optical correction unit using the shake signal to which the first restriction has been set and controlling the second optical correction unit using the shake signal to which the second restriction has been set.

According to the second aspect of the present invention, there is provided an image stabilization apparatus comprising: first optical correction unit configured to optically correct an image blur by moving in a direction different from an optical axis; second optical correction unit, arranged in a position different from the first optical correction unit in the optical axis direction, configured to optically correct the image blur by moving in the direction different from the optical axis; first restriction unit configured to set a first restriction which restricts a driving range of the first optical correction unit to a shake signal detected by shake detection unit; first position detection unit configured to detect a driving position of the first optical correction unit driven by using the shake signal to which the first restriction has been set; subtraction unit configured to obtain a result of subtraction by subtracting a signal in the driving position detected by the first position detection unit from the shake signal detected by the shake detection unit; second restriction unit configured to set a second restriction which restricts a driving range of the second optical correction unit to the result of subtraction; change unit configured to change a restriction value of the first restriction unit and a restriction value of the second restriction unit; and control unit configured to control the first optical correction unit using the shake signal to which the first restriction has been set and controlling the second optical correction unit using the shake signal to which the second restriction has been set.

According to the third aspect of the present invention, there is provided a method of controlling an image stabilization apparatus having first optical correction unit configured to optically correct an image blur by moving in a direction different from an optical axis and second optical correction unit, arranged in a position different from the first optical correction unit in the optical axis direction, configured to optically correcting the image blur by moving in the direction different from the optical axis, the method comprising: a first restriction step of setting a first restriction which restricts a driving range of the first optical correction unit to a shake signal detected by shake detection unit; a subtraction step obtaining a result of subtraction by subtracting the shake signal to which the first restriction has been set from the shake signal detected by the shake detection unit; a second restriction step of setting a second restriction which restricts a driving range of the second optical correction unit to the result of subtraction; a change step of changing a restriction value in the first restriction step and a restriction value in the second restriction step; and a control step of controlling the first optical correction unit using the shake signal to which the first restriction has been set and controlling the second optical correction unit using the shake signal to which the second restriction has been set.

According to the fourth aspect of the present invention, there is provided a method of controlling an image stabilization apparatus having first optical correction unit configured to optically correct an image blur by moving in a direction different from an optical axis and second optical correction unit, arranged in a position different from the first optical correction unit in the optical axis direction, configured to optically correct the image blur by moving in the direction different from the optical axis, the method comprising: a first restriction step of setting a first restriction which restricts a driving range of the first optical correction unit to a shake signal detected by shake detection unit; a first position detection step of detecting a driving position of the first optical correction unit driven by using the shake signal to which the first restriction has been set; a subtraction step obtaining a result of subtraction by subtracting a signal in the driving position detected by the first position detection step from the shake signal detected by the shake detection unit; a second restriction step of setting a second restriction which restricts a driving range of the second optical correction unit to the result of subtraction; a change step of changing a restriction value in the first restriction step and a restriction value in the second restriction step; and a control step of controlling the first optical correction unit using the shake signal to which the first restriction has been set and controlling the second optical correction unit using the shake signal to which the second restriction has been set.

Further features of the present invention will become apparent from the following description of exemplary embodiments with reference to the attached drawings.

BRIEF DESCRIPTION OF THE DRAWINGS

FIG. 6 is a table showing the set values of the first and third drive limiters each corresponding to a variable magnification ratio point according to the first embodiment;

FIGS. 8A and 8B are tables showing the control conditions of the first and second image stabilization lenses according to the first and second embodiments.

DESCRIPTION OF THE EMBODIMENTS

Embodiments of the present invention will be described below with reference to the accompanying drawings.

(First Embodiment)

Figure 1:
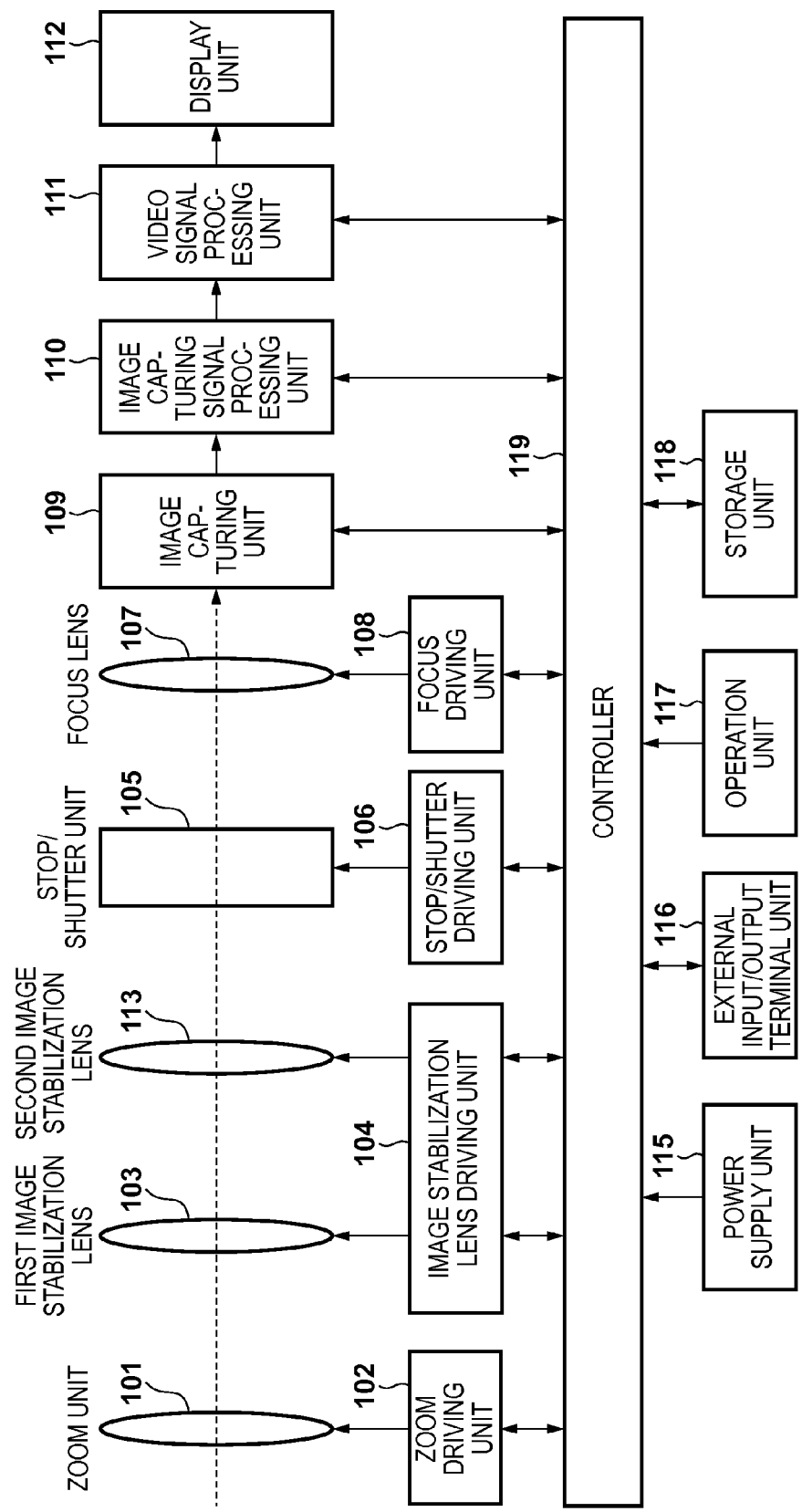
FIG. 1 is a block diagram showing the arrangement of an image stabilization apparatus according to an embodiment of the present invention.

FIG. 1 is a block diagram showing an example of the functional arrangement of an image stabilization apparatus according to the first embodiment of the present invention. In this embodiment, an image capturing apparatus is a digital still camera, which may have a moving image shooting function.

A zoom unit 101 is part of a shooting lens which forms an imaging optical system and can change the magnification ratio. The zoom unit 101 includes a zoom lens for changing the magnification ratio of the shooting lens. A zoom driving unit 102 controls driving of the zoom unit 101 under the control of a controller 119.

A first image stabilization lens 103 serving as a correction member is movable in a direction perpendicular to the optical axis of the shooting lens. An image stabilization lens driving unit 104 controls driving of the first image stabilization lens 103. In addition, a second image stabilization lens 113 which has the same arrangement as the first image stabilization lens is arranged and is controlled to be driven by the image stabilization lens driving unit 104 in the same manner as the first image stabilization lens.

A stop/shutter unit 105 is a mechanical shutter having the stop function. A stop/shutter driving unit 106 drives the stop/shutter unit 105 under the control of the controller 119. A focus lens 107 is part of the shooting lens, and can change its position along the optical axis of the shooting lens. A focus driving unit 108 drives the focus lens 107 under the control of the controller 119.

An image capturing unit 109 converts an optical image formed via the shooting lens into an electrical signal of each pixel using an image sensor such as a CCD image sensor or a CMOS image sensor. An image capturing signal processing unit 110 performs A/D conversion, correlated double sampling, gamma correction, white balance correction, color interpolation processing, and the like for the electrical signal output from the image capturing unit 109, and converts the electrical signal into a video signal. A video signal processing unit 111 processes the video signal output from the image capturing signal processing unit 110 in accordance with an application purpose. More specifically, the video signal processing unit 111 generates a display video, and performs encoding processing and data file processing for recording.

A display unit 112 displays an image based on the display video signal output from the video signal processing unit 111, as needed. A power supply unit 115 supplies power to the entire image capturing apparatus in accordance with an application purpose. An external input/output terminal unit 116 inputs/outputs communication signals and video signals from/to an external apparatus. An operation unit 117 includes buttons and switches used by the user to input instructions to the image capturing apparatus. A storage unit 118 stores various data such as video information. The controller 119 includes, for example, a CPU, a ROM, and a RAM. The controller 119 controls the respective units of the image capturing apparatus by expanding, in the RAM, a control program stored in the ROM and executing it by the CPU, thereby implementing operations of the image capturing apparatus including various operations to be described below.

The operation unit 117 includes a release button configured to sequentially turn on a first switch (SW1) and a second switch (SW2) in accordance with press amounts. The release switch SW1 is turned on when the release button is pressed about halfway, and the release switch SW2 is turned on when it is pressed fully. When the release switch SW1 is turned on, the controller 119 performs, for example, auto focus detection by controlling the focus driving unit 108 based on an AF evaluation value based on a display video signal output from the video signal processing unit 111 to the display unit 112. Furthermore, the controller 119 performs AE processing to decide an f-number and shutter speed for obtaining an appropriate exposure amount based on luminance information of the video signal and, for example, a predetermined program chart. When the release switch SW2 is turned on, the controller 119 controls the respective units to perform shooting at the determined f-number and shutter speed and store image data obtained by the image capturing unit 109 in the storage unit 118.

The operation unit 117 includes an image stabilization switch capable of selecting an image stabilization mode. When the user selects the image stabilization mode with the image stabilization switch, the controller 119 instructs the image stabilization lens driving unit 104 to perform an image stabilization operation. Upon receiving the instruction, the image stabilization lens driving unit 104 executes the image stabilization operation until it is instructed to turn off image stabilization. The operation unit 117 also includes a shooting mode selection switch capable of selecting either a still image shooting mode or a moving image shooting mode. In each shooting mode, the operation condition of the image stabilization lens driving unit 104 can be changed. The operation unit 117 also includes a playback mode selection switch for selecting the playback mode. In the playback mode, the image stabilization operation is stopped. Further, the operation unit 117 includes a magnification ratio change switch used to input a zoom magnification ratio change instruction. When the zoom magnification ratio change instruction is input from the magnification ratio change switch, the zoom driving unit 102 receives the instruction via the controller 119, and drives the zoom unit 101 to move the zoom unit 101 to the instructed zoom position.

(Arrangement of Image Stabilization Lens Driving Unit 104)

Figure 2:
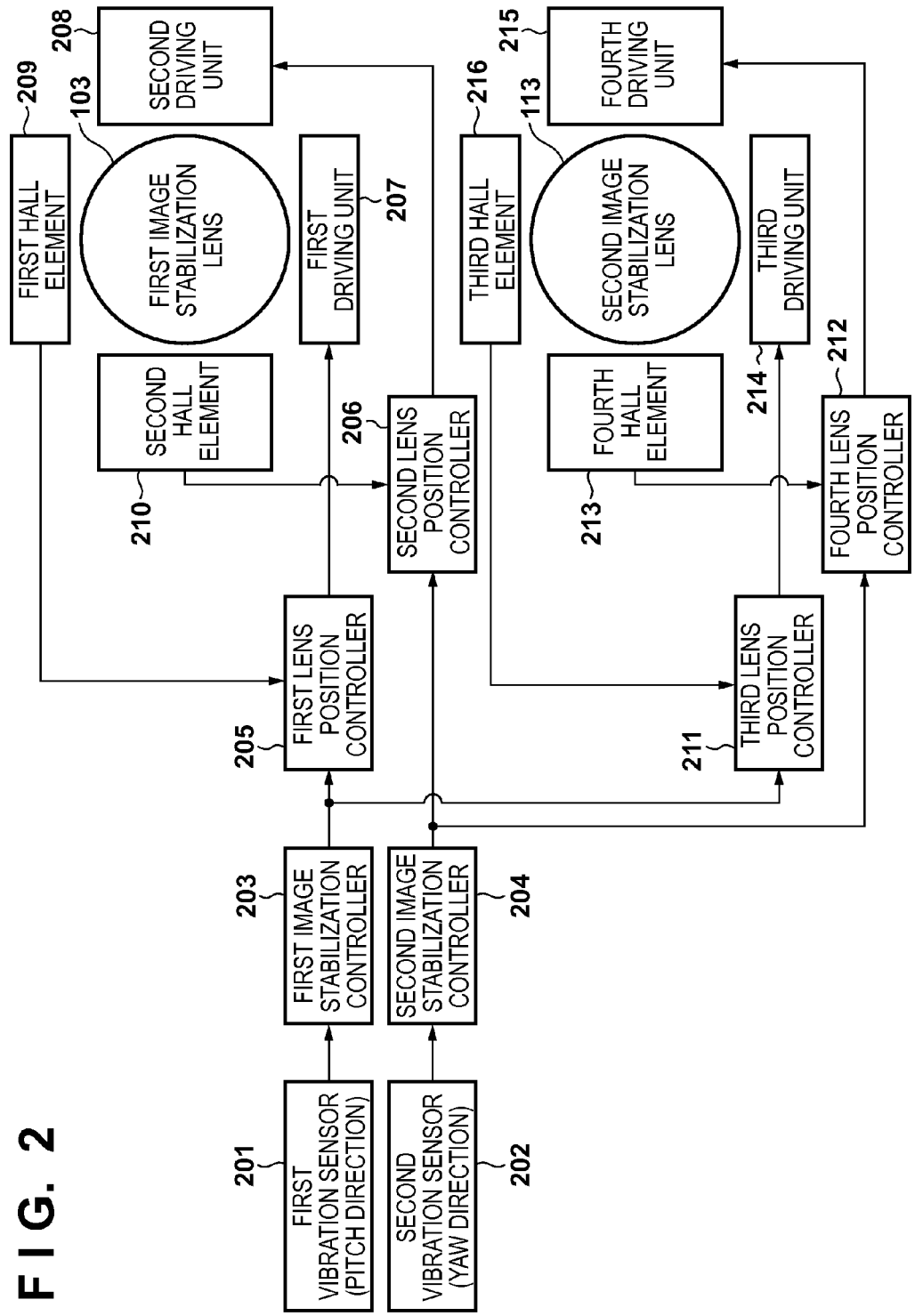
FIG. 2 is a block diagram showing the arrangement of an image stabilization lens driving unit in FIG. 1.

FIG. 2 is a block diagram showing an example of the functional arrangement of the image stabilization lens driving unit 104. A first vibration sensor 201 is, for example, an angular velocity sensor, and detects vibrations in the vertical direction (pitch direction) of the image capturing apparatus in a normal orientation (orientation in which the longitudinal direction of an image almost coincides with the horizontal direction). A second vibration sensor 202 is, for example, an angular velocity sensor, and detects vibrations in the horizontal direction (yaw direction) of the image capturing apparatus in the normal orientation. First and second image stabilization controllers 203 and 204 respectively output correction position control signals of the image stabilization lens in the pitch and yaw directions, and control driving of the image stabilization lens.

A first lens position controller 205 drives a first driving unit 207 which is, for example, an actuator by feedback control based on the correction position control signal in the pitch direction from the first image stabilization controller 203, and position information of the image stabilization lens in the pitch direction from a first Hall element 209. Similarly, a second lens position controller 206 drives a second driving unit 208 which is, for example, an actuator by feedback control based on the correction position control signal in the yaw direction from the second image stabilization controller 204, and position information of the image stabilization lens in the yaw direction from a second Hall element 210.

(Operation of Image Stabilization Lens Driving Unit 104)

Next, the driving control operations of the first image stabilization lens 103 and the second image stabilization lens 113 by the image stabilization lens driving unit 104 shown in FIG. 2 will be explained.

The first and second vibration sensors 201 and 202 respectively supply, to the first and second image stabilization controllers 203 and 204, image blur signals (angular velocity signals) representing shakes of the image capturing apparatus in the pitch and yaw directions. Based on these image blur signals, the first and second image stabilization controllers 203 and 204 generate correction position control signals for driving the first image stabilization lens 103 and the second image stabilization lens 113 in the pitch and yaw directions, and output them to the first lens position controller 205 and a third lens position controller 211, and the second lens position controller 206 and a fourth lens position controller 212.

The first and second Hall elements 209 and 210 output, as pieces of position information of the first image stabilization lens 103 in the pitch and yaw directions, signals each having a voltage corresponding to the strength of a magnetic field generated by the magnet of the first image stabilization lens 103. The pieces of position information are supplied to the first and second lens position controllers 205 and 206. The first and second lens position controllers 205 and 206 perform feedback control while driving the first and second driving units 207 and 208 so that signal values from the first and second Hall elements 209 and 210 converge to the correction position control signal values from the first and second image stabilization controllers 203 and 204.

Feedback control is also performed on the second image stabilization lens 113 by driving third and fourth Hall elements 216 and 213, the third and fourth lens position controllers 211 and 212, and third and fourth driving units 214 and 215 in the same manner.

Note that the position signal values output from the first and second Hall elements 209 and 210, and the third and fourth Hall elements 216 and 213 vary. Hence, outputs from the first and second Hall elements 209 and 210, and the third and fourth Hall elements 216 and 213 are adjusted to move the first and second image stabilization lenses 103 and 113 to predetermined positions in accordance with predetermined correction position control signals.

The first and second image stabilization controllers 203 and 204 output correction position control signals, respectively, to move the positions of the first and second image stabilization lenses 103 and 113 so as to cancel an image blur based on pieces of shake information from the first and second vibration sensors 201 and 202. For example, the first and second image stabilization controllers 203 and 204 can generate correction velocity or correction position control signals based on the pieces of shake information (angular velocity signals), or by performing filter processing or the like on the pieces of shake information. By the above-described operation, even when a vibration such as a camera shake acts on the image capturing apparatus at the time of shooting, an image blur can be prevented against a certain degree of vibration. The first and second image stabilization controllers 203 and 204 detect the panning state of the image capturing apparatus and perform panning control based on pieces of shake information from the first and second vibration sensors 201 and 202, and outputs from the first and second Hall elements 209 and 210, and the third and fourth Hall elements 216 and 213.

(Image Stabilization Mechanism)

Figure 3:
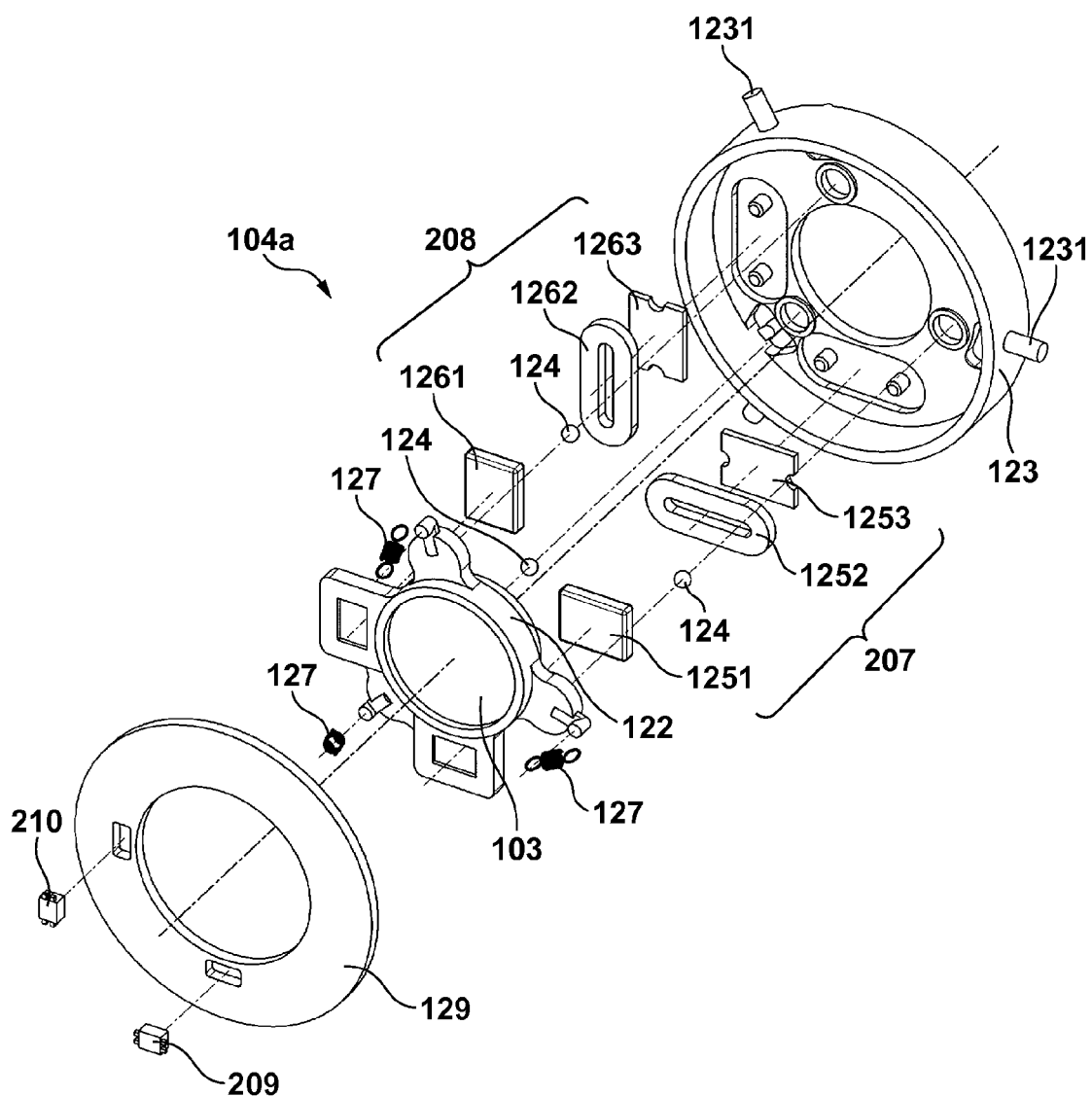
FIG. 3 is an exploded perspective view showing the detailed arrangement of an image stabilization mechanism.

FIG. 3 is an exploded perspective view showing an example of the detailed arrangement of the first image stabilization lens 103 and a first image stabilization mechanism 104a in the image stabilization lens driving unit 104. The first image stabilization mechanism 104a includes the first image stabilization lens 103, a movable lens barrel 122, a fixed base plate 123, rolling balls 124, the first electromagnetic driving unit 207, the second electromagnetic driving unit 208, and biasing springs 127. The first image stabilization mechanism 104a further includes the first Hall element 209, the second Hall element 210, and a sensor holder 129. The first electromagnetic driving unit 207 includes a first magnet 1251, a first coil 1252, and a first yoke 1253. The second electromagnetic driving unit 208 includes a second magnet 1261, a second coil 1262, and a second yoke 1263.

The first image stabilization lens 103 is the first correction optical member that can decenter an optical axis. The first image stabilization lens 103 is controlled to be driven by the aforementioned first image stabilization controller to perform an image stabilization operation of moving an optical image that has passed through the imaging optical system and can secure the stability of the image on the imaging plane. In this embodiment, a correction lens is used as the correction optical system. It is possible, however, to secure the stability of the image on the imaging plane by driving an image capturing means such as a CCD for the imaging optical system. At this time, the image capturing means is used as the correction optical system.

The movable lens barrel 122 is the first movable portion which holds the first image stabilization lens 103 in a central opening. The movable lens barrel 122 holds the first magnet 1251 and the second magnet 1261. Also, the movable lens barrel 122 has three rolling ball receiving portions and is rollingly supported, by the rolling balls 124, to be movable within a plane perpendicular to the optical axis. The movable lens barrel 122 further has three spring hook portions and can hold one end of each biasing spring 127.

The fixed base plate 123 is the first fixed member formed to have a cylindrical shape. The fixed base plate 123 has three followers 1231 in its outer surface. Also, the fixed base plate 123 arranges the movable lens barrel 122 in the central opening to restrict the movable amount of the movable lens barrel 122.

The fixed base plate 123 holds the first coil 1252 and the first yoke 1253 in a portion facing the magnetization surface of the first magnet 1251. The fixed base plate 123 also holds the second coil 1262 and the second yoke 1263 in a portion facing the magnetization surface of the second magnet 1261. Furthermore, the fixed base plate 123 has three rolling ball receiving portions and supports the movable lens barrel 122 via the rolling balls 124 to be movable within the plane perpendicular to the optical axis. The fixed base plate 123 also has three spring hook portions and holds one end of each biasing spring 127.

The first electromagnetic driving unit 207 is a known voice coil motor. The first electromagnetic driving unit 207 supplies a current through the first coil 1252 attached to the fixed base plate 123, thereby generating a Lorentz force between the first coil 1252 and the first magnet 1251 fixed to the movable lens barrel 122, and drives the movable lens barrel 122. The second electromagnetic driving unit 208 is a similar voice coil motor to the first electromagnetic driving unit 207 arranged with a rotation of 90°, and thus a detailed description thereof will be omitted.

Each biasing spring 127 is a tension spring which generates a biasing force in proportion to a deformation amount. Each biasing spring 127 generates the biasing force between the movable lens barrel 122 and the fixed base plate 123 with its one end being fixed to the movable lens barrel 122 and its other end being fixed to the fixed base plate 123. The rolling balls 124 are clamped by this biasing force, and can maintain a contact state between the fixed base plate 123 and the movable lens barrel 122.

The first Hall element 209 and the second Hall element 210 are two magnetic sensors using Hall elements which read the magnetic fluxes of the first magnet 1251 and the second magnet 1261, and can detect the movement of the movable lens barrel 122 within a plane from changes in their outputs.

The sensor holder 129 is formed to have an almost disk shape and fixed to the fixed base plate 123. The sensor holder 129 holds the first and second Hall elements 209 and 210 in positions facing the first magnet 1251 and the second magnet 1261. Further, the sensor holder 129 accommodates the movable lens barrel 122 in an internal space formed together with the fixed base plate 123. This makes it possible to prevent internal components from dropping off even when an impact force is applied to the image stabilization apparatus or an orientation difference changes.

With this arrangement, the first image stabilization mechanism 104a in the image stabilization lens driving unit 104 can move the first image stabilization lens 103 to an arbitrary position on the plane perpendicular to the optical axis.

Figure 4:
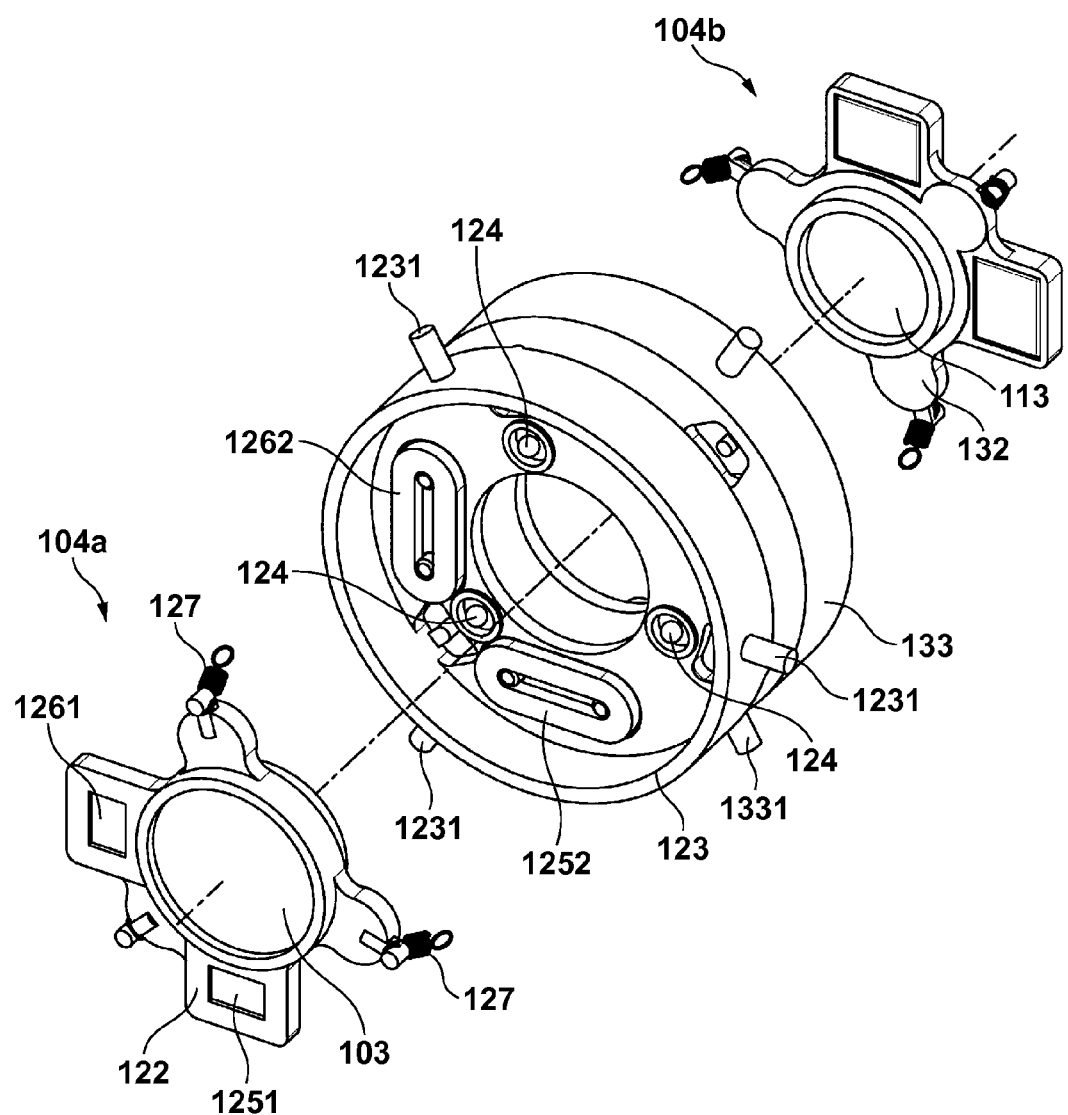
FIG. 4 is an exploded perspective view showing the arrangement of the image stabilization mechanism.

The positional relationship between the first image stabilization mechanism 104a and a second image stabilization mechanism 104b in the image stabilization lens driving unit 104 will be described with reference to FIG. 4. FIG. 4 is a perspective view showing the first and second image stabilization mechanisms 104a and 104b, parts of which are exploded and omitted for the sake of simplicity.

The second image stabilization mechanism 104b and the second image stabilization lens 113 form the second image stabilization apparatus and are equivalent to the second correction optical system. A movable lens barrel 132 is equivalent to the second movable portion and a fixed base plate 133 is equivalent to the second fixed portion. The second image stabilization mechanism 104b has the same arrangement as the first image stabilization mechanism 104a except for the shape of the lens and the shape of the movable lens barrel 132 which holds the lens, and thus a detailed description thereof will be omitted.

(Arrangement of Image Stabilization Controller and Lens Position Controller)

Figure 5:
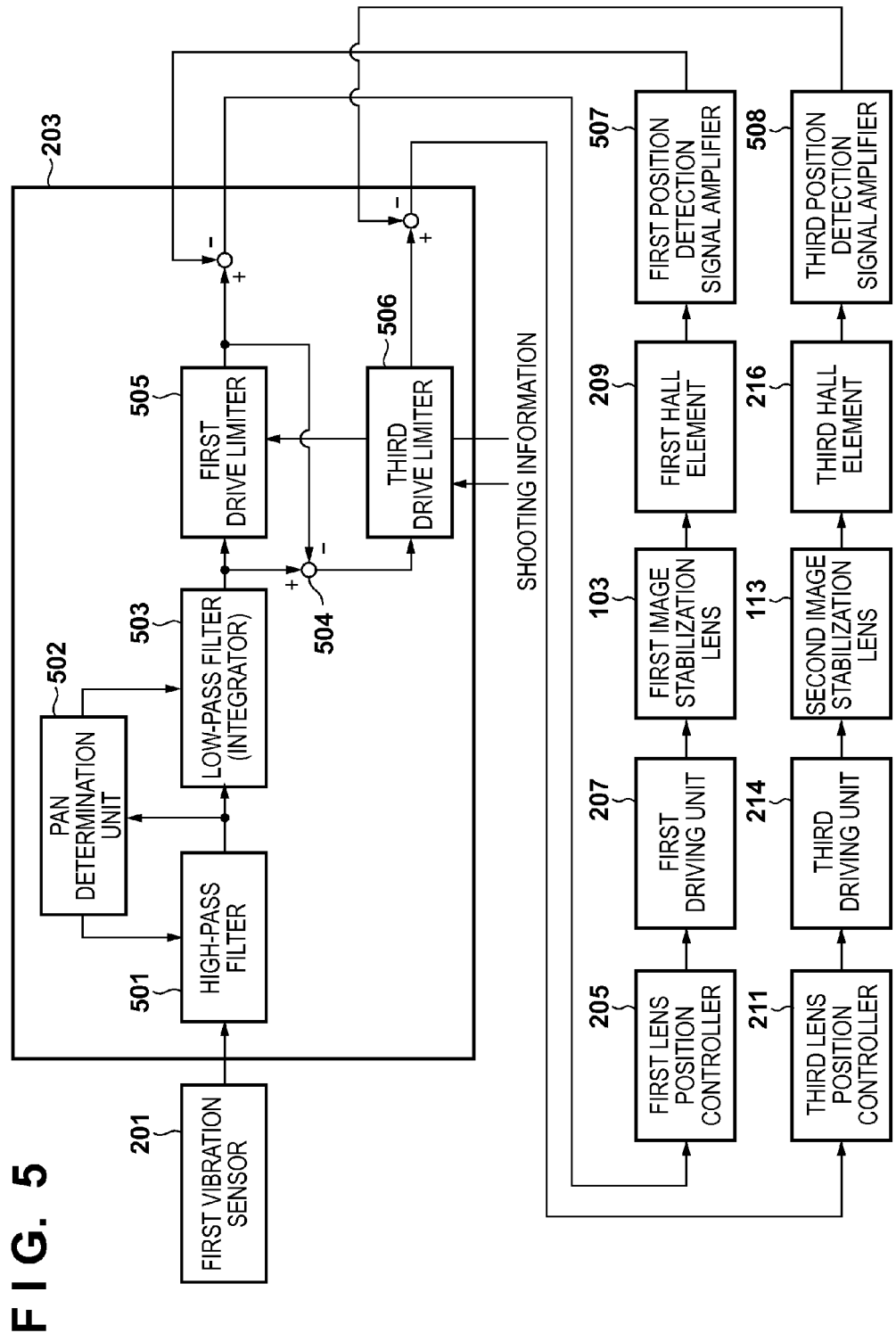
FIG. 5 is a block diagram showing the internal arrangement of an image stabilization controller and a lens position controller according to the first embodiment.

FIG. 5 is a block diagram showing the internal arrangement of the first image stabilization controller 203, the first lens position controller 205, and the third lens position controller 211. Note that the second image stabilization controller 204, the second lens position controller 206, and the fourth lens position controller 212 have the same internal arrangement as the first image stabilization controller 203, the first lens position controller 205, and the third lens position controller 211, and thus a description thereof will be omitted.

Referring to FIG. 5, the first vibration sensor 201 detects an image blur signal (angular velocity signal) applied to the camera. A high-pass filter (HPF) 501 whose time constant until filter stability is changeable removes an offset component included in the low-frequency band of the image blur signal detected by the first vibration sensor 201. Next, a low-pass filter (LPF) 503 whose time constant until filter stability is changeable performs integration processing to generate a shake angular signal. Note that the fact that the time constant until filter stability is changeable means the fact that, for example, a cutoff frequency is changeable by changing the coefficient of a digital filter. Alternatively, it means that a buffer which holds an arithmetic result (intermediate value) in the operation of the digital filter can be rewritten freely at an arbitrary timing.

A pan determination unit 502 determines a panning operation if the image blur signal detected by the first vibration sensor 201 or the second vibration sensor 202 when the image capturing apparatus is greatly shaken or is subjected to by the panning or tilting operation, the current position of the first image stabilization lens 103 or the current position of the second image stabilization lens 113, or the target position information of each image stabilization lens is compared with a predetermined value determined in advance and becomes larger than the predetermined value, or if the position of each of the first image stabilization lens 103 and the second image stabilization lens 113 greatly shifts from the center position of the lens. The pan determination unit 502 performs change processes of the time constants of the HPF 501 and the LPF 503 until filter stability. When a large shake acts on the image capturing apparatus, this processing prevents driving of the image stabilization lens by more than a movable range, and also prevents a shot image from becoming unstable owing to a swing-back immediately after the panning operation. Furthermore, it is possible to output the output of the filter with an arbitrary magnification ratio by changing the coefficients of the HPF 501 and the LPF 503.

The shake angular signal generated as described above is input to the first lens position controller 205 as the target position of the first image stabilization lens after its driving amount is restricted by a first drive limiter 505.

The position information detected by the first Hall element 209 which detects the position (moving distance) of the first image stabilization lens 103 is amplified to a predetermined magnitude by a first position detection signal amplifier 507, and then compared with the target position of the image stabilization lens output from the first drive limiter 505. After that, the image stabilization operation is performed by position feedback control via the first driving unit 207. A signal obtained by restricting, using a third drive limiter 506, a signal (result of subtraction) obtained by calculating, using a subtracter 504, a difference between the target positions of the image stabilization lens before and after being restricted by the first drive limiter 505 is held as the target position of the second image stabilization lens 113. Furthermore, the position information detected by the third Hall element 216 which detects the position of the second image stabilization lens 113 is amplified to a predetermined magnitude by a third position detection signal amplifier 508, and then compared with the held target position of the second image stabilization lens. After that, the image stabilization operation is performed by driving the second image stabilization lens 113 by position feedback control via the third driving unit 214. As described above, the target value of the second image stabilization lens 113 is determined based on the target position calculated by the subtracter 504. This means that the first image stabilization lens has not finished image stabilization and this uncorrected image stabilization component is removed by the second image stabilization lens.

The restriction values of the first drive limiter 505 and the third drive limiter 506 are changed by shooting information instructed by the operation unit 117. The instructed shooting information includes, for example, a shooting magnification ratio change instruction to the zoom driving unit 102, object distance information, exposure start notification information by the release switches, shooting mode change information, for example, between the moving image shooting mode and the still image shooting mode by the operation unit 117, and image stabilization lens position information.

When changing shake correction lenses which perform shake correction by the shooting magnification ratio change instruction, the restriction values of the first drive limiter 505 and the third drive limiter 506 are changed as shown in FIG. 6. When there are three points from the wide-angle side to the high-magnification side where a variable magnification ratio point can be changed, assume that a driving limit position where each of the first and second image stabilization lenses can be driven is 100%. In this case, the restriction value of the first drive limiter is set to 100% and the restriction value of the third drive limiter is set to 0% on the wide-angle side. By doing so, since only the first image stabilization lens receives a shake correction target position and is driven, the second image stabilization lens is held in the center position of the driving limit position and is not driven. As a result, a shake correction operation is only performed by the first image stabilization lens. Further, if the restriction value of the first drive limiter is set to 0% and the restriction value of the third drive limiter is set to 100% on the high-magnification side, only the second image stabilization lens receives the shake correction target position and is driven. Therefore, the first image stabilization lens is held in the center position of the driving limit position and is not driven, and a shake correction operation is only performed by the second image stabilization lens. Furthermore, in the intermediate position of these variable magnification ratio points, the restriction value of the first drive limiter is set to 50% and the restriction value of the third drive limiter is set to 50%. By doing so, since the first and second image stabilization lenses receive the shake correction target positions and are driven, the shake correction operations are performed by both of the first and second image stabilization lenses.

By opening and restricting the first and third drive limiters continuously as well as changing the variable magnification ratio points as described above, it is possible to switch the image stabilization lenses which perform image stabilization successively without making the shot image unnatural.

According to the object distance information, a larger set value of the first drive limiter is set when the object distance is close as compared with a case in which the object distance is far. This is because when the object distance is close, the influence of a shake component parallel to the optical axis, in addition to an angular shake, is large, and thus the wider movable range of the shake correction lens is needed.

Additionally, a larger set value of the second drive limiter is set during exposure than in a shooting standby state before receiving the exposure start notification information by the release switches. By setting a larger set value of the first drive limiter or the second drive limiter only when the wider movable range of the shake correction lens is needed as described above, it is possible to secure the movable range of the shake correction lens when, for example, the object distance becomes closer or during exposure and prevent a shake correction effect from being decreased. Likewise, by setting a larger set value of the first drive limiter of the first image stabilization lens when the second image stabilization lens reaches the movable range, it is possible to secure a shake correctable angle.

The arrangement of each of the first lens position controller 205 and the third lens position controller 211 may use any control arithmetic unit but uses, for example, PID control.

A method of controlling each image stabilization lens performed in the image capturing apparatus arranged as described above will be described with reference to FIG. 7.

Figure 7:
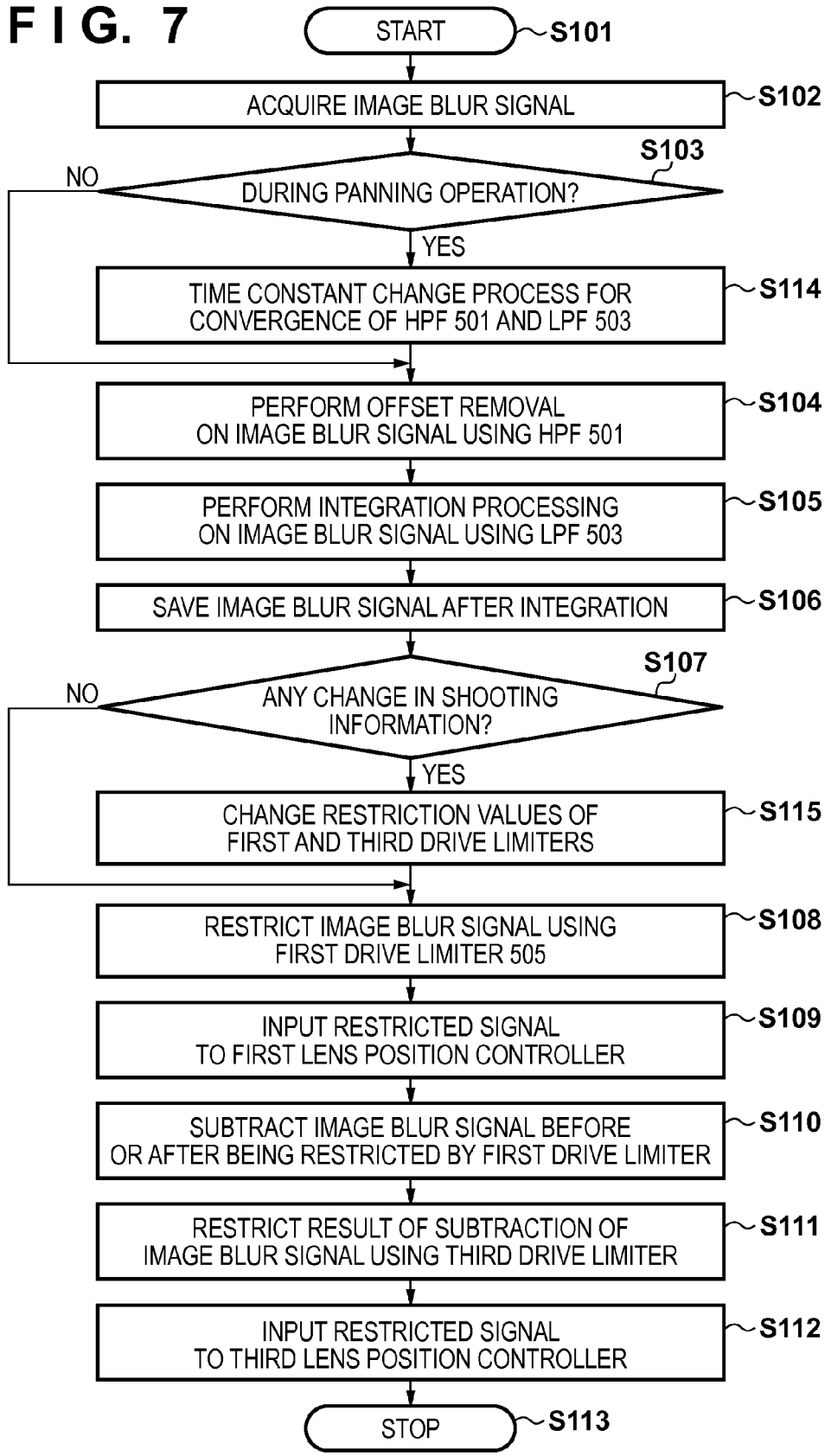
FIG. 7 is a flowchart of processing of the image stabilization controller according to the first embodiment.

FIG. 7 is a flowchart showing calculation of the target position of each image stabilization lens performed in the image capturing apparatus according to this embodiment. An arithmetic operation of the target position of each image stabilization lens is performed at a predetermined periodical interval. First, the first vibration sensor 201 acquires the image blur signal (step S102). Next, the pan determination unit 502 determines whether the image capturing apparatus is performing the panning operation (step S103). If the pan determination unit 502 determines that the image capturing apparatus is performing the panning operation, arithmetic processing of shortening the time constants of the HPF 501 and the LPF 503 until arithmetic stability is performed (step S114).

On the other hand, if the pan determination unit 502 determines that the image capturing apparatus is not performing the panning operation, the process advances to step S104 without performing the change processes of the time constants of the HPF 501 and the LPF 503. In step S104, the HPF 501 restricts a band to remove the offset component included in the low-frequency band from the image blur signal acquired in step S102. Further, the LPF 503 performs integration and converts shake angular velocity information into shake angular information (step S105). Then, the output value of the LPF 503 is held as the target position of the first image stabilization lens in step S106. In step S107, it is further determined whether a change has been made to the shooting information instructed by the operation unit 117. If the change has been made here, the restriction value by each of the first and third drive limiters is changed to a predetermined value in step S115. If no change has been made to the shooting information, the process advances to step S108. After the first drive limiter 505 restricts the target position of the first image stabilization lens held in step S106 to a predetermined size in step S108, the resultant position is input to the first lens position controller 205 (step S109) to drive the first image stabilization lens.

On the other hand, the image blur signal before or after being restricted by the first drive limiter is subtracted by the subtracter 504 (step S110), restricted by the third drive limiter (step S111), and then input to the third lens position controller 211 as the target position of the second image stabilization lens (step S112). Then, the second image stabilization lens is driven.

As described above, the first and second image stabilization lenses are driven with respect to the image blur signal applied to the image capturing apparatus, thereby removing the influence of the image blur acting on the image capturing apparatus.

The driving conditions of the first and second image stabilization lenses according to this embodiment will now be described with reference to FIGS. 8A and 8B.

This embodiment is described assuming that the first image stabilization lens is a tilt lens and the second image stabilization lens is a shift lens. However, an opposite arrangement is also possible.

[Image Stabilization Target Position]

A determination method of the image stabilization target positions of the first and second image stabilization lenses performs image stabilization by first driving the first image stabilization lens in accordance with the image blur signal obtained by restricting the image blur signal by the first drive limiter. Then, a signal obtained by subtracting the target position of the first image stabilization lens from the image blur signal is defined as the image stabilization target position of the second image stabilization lens.

[Degradation in Optical Performance caused by Lens Driving]

In general, a peripheral light amount, a resolution, an aberration, and the like tend to degrade as the driving amount of each image stabilization lens increases. It is therefore preferable to have an arrangement in which the optical performance which is driven by the first image stabilization lens mainly used to prevent a large shake on the wide-angle side is less likely to degrade than the optical performance of the second image stabilization lens.

[Driving Method of Image Stabilization Lens]

The degradation in the optical performance is generally smaller under a certain condition in, out of driving methods of the image stabilization lens, the known driving method which tilts (can tilt) the lens with respect to the optical axis than the driving method which shifts (can shift) the lens on the plane perpendicular to the optical axis. For this reason, this embodiment adopts an arrangement in which the first image stabilization lens is driven in a tilt direction.

[Position to Arrange Lens]

As for a position to arrange the lens, the lens arranged on an object side generally has, under a certain condition, a larger image stabilization angle and less degradation in the optical performance with respect to the driving amount of the image stabilization lens. For this reason, this embodiment adopts an arrangement in which the first image stabilization lens is arranged closer to the object side.

[Amplification Ratio of Position Detection Signal]

The amplification ratio of a position detection signal amplifier which amplifies a Hall element signal for detecting an image stabilization lens position to a predetermined magnification ratio sets the amplification ratio of the first image stabilization lens to be smaller than that of the second stabilization lens. This is because although a resolution for position detection increases as the Hall signal amplification ratio of the position detection signal amplifier is larger, it is often impossible to secure a wide dynamic range within a limited voltage range when an A/D converter or the like digitally acquires an amplified electrical signal. In order to achieve both of the desired resolution and dynamic range, the position detection amplification ratio of the first image stabilization lens which is likely to be driven largely and has the wide dynamic range is decreased. Furthermore, the position detection amplification ratio of the second image stabilization lens is set to be large in order to increase shake correction accuracy for a small high-frequency shake which is noticeable on the high-magnification side. Setting is therefore preferably made such that the dynamic range is narrow but the resolution for position detection is high.

[Frequency Band of Feedback Controller]

The control band of the frequency characteristic of the feedback controller of the second image stabilization lens aiming at correcting a small image blur on the high-magnification side is set to be higher than the control band of the frequency characteristic of the feedback controller of the first image stabilization lens.

[Image Stabilization Angle with Respect to Lens Driving Stroke]

Image stabilization angles obtained with respect to the same driving stroke differ due to the optical characteristics of the image stabilization lenses. The first image stabilization lens which needs a larger image stabilization angle uses a lens having a larger image stabilization angle obtained with respect to a driving stroke than the second image stabilization lens.

With the above-described arrangement, it is possible to make the mechanical configuration of the first image stabilization lens which tends to need a large driving stroke as small as possible, and to provide an image stabilization apparatus having a high shake correction effect without increasing the size and a method of controlling the same.

(Second Embodiment)

This embodiment has the same arrangement as the first embodiment except for the arrangement of a first image stabilization controller 203 such as the driving conditions of the first and second image stabilization lenses, and thus a description thereof will be omitted.

[Arrangement of Image Stabilization Controller and Lens Position Controller]

Figure 9:
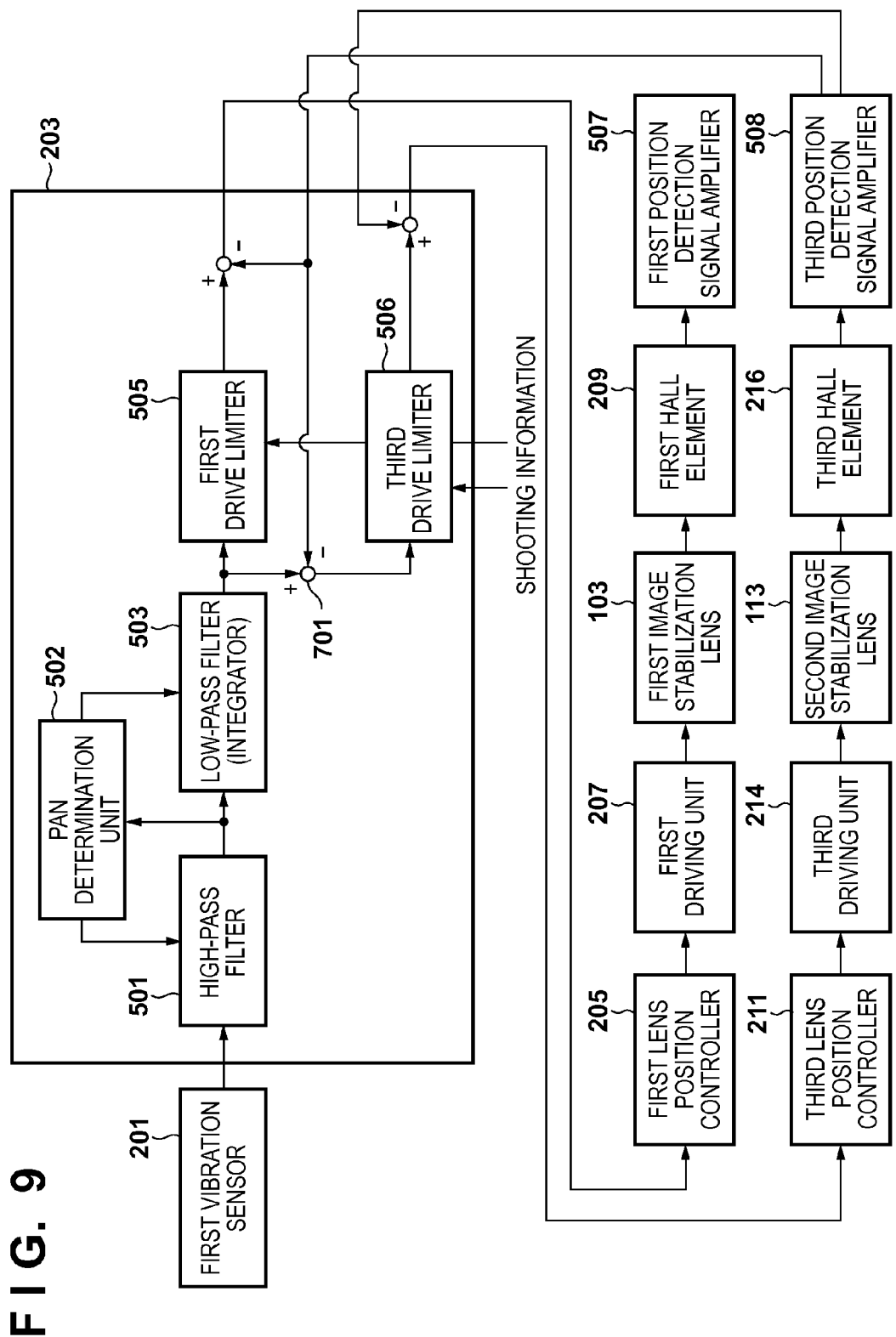
FIG. 9 is a block diagram showing the internal arrangement of an image stabilization controller and a lens position controller according to the second embodiment.

FIG. 9 is a block diagram showing the internal arrangement of the first image stabilization controller 203, a first lens position controller 205, and a third lens position controller 211. Note that a second image stabilization controller 204, a second lens position controller 206, and a fourth lens position controller 212 have the same internal arrangement as the first image stabilization controller 203, the first lens position controller 205, and the third lens position controller 211, and thus a description thereof will be omitted.

Referring to FIG. 9, the only difference from the first embodiment is the operation of a subtracter 701 which calculates the target position of the second image stabilization lens from the uncorrected image stabilization component of the first image stabilization lens. In the first embodiment, the subtracter 504 calculates the difference between the target positions of the first image stabilization lens before and after being restricted by the first drive limiter 505. Then, a signal restricted by the third drive limiter 506 is defined as the target position of the second image stabilization lens 113.

On the contrary, in this embodiment, the subtracter 701 calculates a difference between the target position of the first image stabilization lens before being restricted by a first drive limiter 505 and the actual position of the first image stabilization lens obtained from a first position detection signal amplifier 507. Then, this signal restricted by a third drive limiter 506 is defined as the target position of a second image stabilization lens 113. With this arrangement, an uncorrected image stabilization component signal calculated by the subtracter 701 also includes, for example, an error component generated when the first image stabilization lens could not follow the target position completely owing to an external disturbance such as a frictional force. It is therefore possible for the second image stabilization lens 113 to also correct the error component of a first image stabilization lens 103.

As described above, the first and second image stabilization lenses are driven with respect to an image blur signal applied to an image capturing apparatus, thereby removing the influence of an image blur acting on the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-084964, filed Apr. 16, 2014 which is hereby incorporated by reference herein in its entirety.

What is claimed is:

1. An image stabilization apparatus comprising:
   a first optical correction unit that has a first correction member and optically corrects an image blur by moving the first correction member in a direction different from an optical axis;
   a second optical correction unit that has a second correction member and optically corrects the image blur by moving the second correction member in a direction different from the optical axis, the second correction member being arranged in a position different from the first correction member in the optical axis direction; and
   at least one processor configured to perform the operations of the following units:
   a first restriction unit configured to set a first restriction which restricts a driving range of the first optical correction unit to a shake signal detected by a shake detection unit;
   a subtraction unit configured to obtain a result of subtraction by subtracting the shake signal to which the first restriction has been set from the shake signal detected by the shake detection unit;
   a second restriction unit configured to set a second restriction which restricts a driving range of the second optical correction unit to the result of subtraction;
   a change unit configured to change a restriction value of the first restriction unit and a restriction value of the second restriction unit; and
   a control unit configured to control the first optical correction unit using the shake signal to which the first restriction has been set and controlling the second optical correction unit using the shake signal to which the second restriction has been set.

2. The apparatus according to claim 1, wherein when a focal length is smaller than a predetermined value, degradation in optical performance with respect to a driving amount in the first optical correction unit is smaller than degradation in the optical performance with respect to the same driving amount as that of the first optical correction unit in the second optical correction unit, and when the focal length is larger than the predetermined value, the degradation in the optical performance with respect to the driving amount in the first optical correction unit is larger than the degradation in the optical performance with respect to the same driving amount as that of the first optical correction unit in the second optical correction unit.

3. The apparatus according to claim 1, wherein the control unit controls the restriction value of the second restriction to be smaller than the restriction value of the first restriction when a focal length is smaller than a predetermined value and to be larger than the restriction value of the first restriction when the focal length is larger than the predetermined value.

4. The apparatus according to claim 1, wherein the control unit controls the restriction value of the second restriction to be smaller than the restriction value of the first restriction when exposure is not performed and to be larger than the restriction value of the first restriction when the exposure is performed.

5. The apparatus according to claim 1, wherein the control unit increases the restriction value of the first restriction when a distance of the second optical correction unit from the optical axis becomes larger than a predetermined value.

6. An image stabilization apparatus comprising:
  a first optical correction unit that has a first correction member and optically corrects an image blur by moving the first correction member in a direction different from an optical axis;
  a second optical correction unit that has a second correction member and optically corrects the image blur by moving the second correction member in a direction different from the optical axis, the second correction member being arranged in a position different from the first correction member in the optical axis direction;
  a position detector that detects a driving position of the first optical correction unit; and
  at least one processor configured to perform the operations of the following units:
  a first restriction unit configured to set a first restriction which restricts a driving range of the first optical correction unit to a shake signal detected by a shake detection unit;
  a first position detection unit configured to detect, by using the position detector, a driving position of the first optical correction unit driven by using the shake signal to which the first restriction has been set;
  a subtraction unit configured to obtain a result of subtraction by subtracting a signal in the driving position detected by the first position detection unit from the shake signal detected by the shake detection unit;
  a second restriction unit configured to set a second restriction which restricts a driving range of the second optical correction unit to the result of subtraction;
  a change unit configured to change a restriction value of said the first restriction unit and a restriction value of the second restriction unit; and
  a control unit configured to control the first optical correction unit using the shake signal to which the first restriction has been set and controlling the second optical correction unit using the shake signal to which the second restriction has been set.

7. A method of controlling an image stabilization apparatus having a first optical correction unit configured to optically correct an image blur by moving in a direction different from an optical axis and a second optical correction unit, arranged in a position different from said first optical correction unit in the optical axis direction, configured to optically correct the image blur by moving in the direction different from the optical axis, the method comprising:
  setting a first restriction which restricts a driving range of the first optical correction unit to a shake signal detected by a shake detection unit;
  obtaining a result of subtraction by subtracting the shake signal to which the first restriction has been set from the shake signal detected by the shake detection unit;
  setting a second restriction which restricts a driving range of the second optical correction unit to the result of subtraction;
  changing a restriction value in t le first restriction and a restriction value in the second restriction; and
  controlling the first optical correction unit using the shake signal to which the first restriction has been set and controlling the second optical correction unit using the shake signal to which the second restriction has been set.

8. A non-transitory computer readable storage medium storing a program that causes a computer to execute each step of a method of controlling an image stabilization apparatus having a first optical correction unit configured to optically correct an image blur by moving in a direction different from an optical axis and a second optical correction unit, arranged in a position different from said first optical correction unit in the optical axis direction, configured to optically correcting the image blur by moving in the direction different from the optical axis, the method comprising:
  setting a first restriction which restricts a driving range of the first optical correction unit to a shake signal detected by a shake detection unit;
  obtaining a result of subtraction by subtracting the shake signal to which the first restriction has been set from the shake signal detected by the shake detection unit;
  setting a second restriction which restricts a driving range of the second optical correction unit to the result of subtraction;
  changing a restriction value in the first restriction and a restriction value in the second restriction; and
  controlling the first optical correction unit using the shake signal to which the first restriction has been set and controlling the second optical correction unit using the shake signal to which the second restriction has been set.

9. A method of controlling an image stabilization apparatus having a first optical correction unit configured to optically correct an image blur by moving in a direction different from an optical axis and a second optical correction unit, arranged in a position different from said first optical correction unit in the optical axis direction, configured to optically correct the image blur by moving in the direction different from the optical axis, the method comprising:
  setting a first restriction which restricts a driving range of the first optical correction unit to a shake signal detected by a shake detection unit;
  detecting a driving position of the first optical correction unit driven by using the shake signal to which the first restriction has been set;
  obtaining a result of subtraction by subtracting a signal in the driving position detected in the detecting from the shake signal detected by the shake detection unit;

setting a second restriction which restricts a driving range of the second optical correction unit to the result of subtraction;

changing a restriction value in the first restriction and a restriction value in the second restriction; and controlling the first optical correction unit using the shake signal to which the first restriction has been set and controlling the second optical correction unit using the shake signal to which the second restriction has been set.

10. A non-transitory computer readable storage medium storing a program that causes a computer to execute each step of a method of controlling an image stabilization apparatus having a first optical correction unit configured to optically correct an image blur by moving in a direction different from an optical axis and a second optical correction unit, arranged in a position different from said first optical correction unit in the optical axis direction, configured to optically correct the image blur by moving in the direction different from the optical axis, the method comprising:

setting a first restriction which restricts a driving range of the first optical correction unit to a shake signal detected by a shake detection unit;

detecting a driving position of the first optical correction unit driven by using the shake signal to which the first restriction has been set;

obtaining a result of subtraction by subtracting a signal in the driving position detected in the detecting from the shake signal detected by the shake detection unit;

setting a second restriction which restricts a driving range of the second optical correction unit to the result of subtraction;

changing a restriction value in the first restriction and a restriction value in the second restriction; and controlling the first optical correction unit using the shake signal to which the first restriction has been set and controlling the second optical correction unit using the shake signal to which the second restriction has been set.

\* \* \* \* \*